United States Patent [19]

Snook

[11] Patent Number: 5,352,026
[45] Date of Patent: Oct. 4, 1994

[54] BAR DRIVE WHEEL AND ADAPTER

[76] Inventor: Steven J. Snook, 3752 Helena Cir., La Verne, Calif. 91750-3238

[21] Appl. No.: 139,095
[22] Filed: Oct. 21, 1993
[51] Int. Cl.$^5$ .......................................... B60B 27/00
[52] U.S. Cl. .............................. 301/105.1; 301/35.58; 301/111
[58] Field of Search ............... 301/35.53, 35.55, 35.56, 301/35.58, 35.63, 59, 61, 105.1, 111, 114, 115, 116, 122, 35.62

[56] References Cited

U.S. PATENT DOCUMENTS

| | | | |
|---|---|---|---|
| 1,252,455 | 1/1918 | Lee | 301/35.58 |
| 1,398,615 | 11/1921 | Williams | 301/35.58 X |
| 1,483,641 | 2/1924 | Mongomery et al. | 301/35.63 |
| 4,478,458 | 10/1984 | Flexman | 301/35.58 |
| 4,944,562 | 7/1990 | Garrison | 301/111 |

*Primary Examiner*—Russell D. Stormer
*Attorney, Agent, or Firm*—William L. Chapin

[57] ABSTRACT

A vehicle wheel and adapter allowing the wheel to be fastened by means of a single knock-off type hub nut to a disk brake hub or brake drum of a vehicle utilizing wheels of the type that are attached by a plurality of lug bolts or lug nuts arranged in a circular pattern includes a circular adapter plate provided with mounting holes to permit the adapter to be attached using existing lug bolts or lug nuts. The adapter plate has an axially forwardly protruding central coaxial tube section externally threaded on an outer axial portion thereof, and a plurality of axially forwardly protruding engagement bars disposed radially outwards from the tube section. A wheel hub having a tubular front section and a larger diameter, dish-shaped rear section has a flat, circular inner wall provided with grooves adapted to insertably receive the engagement bars of the adapter plate. The tubular front section of the wheel hub has an inwardly and rearwardly tapered, frusto-conically shaped entrance opening. A slotted hub nut having a slotted, frusto-conically shaped outer wall is distorted radially outwards when tightened on the threaded tube section of the adapter, thereby exerting radially outwardly directed centering forces on the wheel hub.

21 Claims, 4 Drawing Sheets

BAR DRIVE WHEEL AND ADAPTER

BACKGROUND OF THE INVENTION

A. Field of the Invention

The present invention relates to wheels used for automobiles, motorcycles, and other such vehicles. More particularly, the invention relates to an improved wheel of the knock-off hub type, and an adapter that permits ready installation of the wheel on vehicles originally equipped with brake drums or disks utilizing a plurality of bolts or nuts to attach the wheels to the vehicle.

B. Description of Background Art

A variety of different designs have been employed for detachable wheels used on automobiles, trucks, motorcycles and similar powered vehicles.

For example, Ash, U.S. Pat. No. 1,313,976, Aug. 26, 1919. discloses a Detachable Wheel For Automobiles that employs a plurality of radially and axially symmetric, axially projecting circular cross-section lugs to engage through-holes provided in the inner base flange of a demountable wire wheel.

Webster, U.S. Pat. No. 1,345,648, Jul. 6, 1920 discloses a Wheel Hub for detachable wheels that uses a plurality of radially and axially symmetric, radial sector-shaped lugs to engage radial slots in a demountable wheel.

Gordon, U.S. Pat. No. 3,425,670, Feb. 4, 1969 discloses a Wheel Assembly which uses tapered lugs on a frustoconic flaring unit attached to an axle to engage the beveled inner surface of a wheel hub.

Other U.S. Patents relating to the attachment of a wheel to the driving hubs of a vehicle include:

Sager, U.S. Pat. No. 4,029,423, Jun. 14, 1977, Free-Wheeling Spindle Adaptor: Discloses an adaptor capable of being mounted to the drive hubs of a vehicle to allow the vehicle to roll freely without rotation of the drive hubs or drive train. The adaptor includes an adaptor spindle which can be directly mounted to the drive hub using the wheel studs. A free-wheeling hub is mounted onto the adaptor spindle and includes a stud flange and studs providing an identical attachment pattern to that of the drive hub. The wheel of the vehicle may therefore be mounted on the free-wheeling hub such that the vehicle may be towed without injury to the drive line.

Hayashi U.S. Pat. No. 4,537,449, Aug. 27, 1985, Vehicle Wheel Attaching Device Discloses a vehicle wheel attaching device for removably attaching general-road traveling wheels to the hubs of a vehicle by utilizing an independent adapter in a manner enabling transmission of torque. The adapter is made approximately in the form of a top hat and is bent at its top to form a dish spring surface for contact with the head of a center bolt which extends outward through a central hole in the adapter. A center nut is attached to the projecting outer end of the bolt, the nut being tightened to permit elastic action of the top surface of the adapter, thereby fixing the wheel in position in a non-rigid condition.

Garrison, U.S. Pat. No. 4,944,562 Jul. 31 1990, Wire Wheel Hub Adapter Apparatus: Discloses an adapter that allows installation of knock-off type wire wheels onto a studded brake drum. The adapter permits a wire wheel formed with an internally splined hub to be secured to the axle of the adapter. The adapter includes a central flange formed with a hollow axially aligned support hub formed with gradually increasing wall thickness to effect enhanced strength of the hub and ensure alignment of an associated extending axle. The extending axle includes an externally splined shaft located inward from the outer end of the axle, for receiving the associated wire wheel at an outwardly distal end, and an externally threaded outward portion for receiving the locking hub. In addition to the wire wheel adapter apparatus disclosed in Garrison, hub-centric, positive engagement wheel/ adapter combinations known to the present inventor comprise two main types. One type employs complementary radially disposed teeth and grooves in the outer circular face of an adapter and the inner circular face of a wheel hub, respectively. A second type of wheel/adapter combination uses longitudinally disposed splines on the outer cylindrical surface of an adapter tube, and complementary longitudinally disposed splines on the inner cylindrical surface of the hub tube.

The present invention was conceived of to provide an improved adapter and wheel combination that allows wheels of the knock-off hub type to be installed on the disk hub or brake drum of the type used on most vehicles, in which a plurality of lug nuts or bolts hold the wheel by the hub or drum.

OBJECTS OF THE INVENTION

An object of the present invention is to provide a vehicle wheel attachable by a single hub nut of the knock-off type, and an associated adapter that allows the wheel to be attached to the disk hub or brake drum of a vehicle that normally utilizes a plurality of lug nuts or lug bolts to fasten original equipment wheels to the vehicle.

Another object of the invention is to provide a hub-centric knock-off hub wheel and adapter in which the adapter may be semi-permanently fastened to a disk hub or brake drum of a vehicle using existing lug bolts or lug nuts, and the wheel quickly installed and removed from the vehicle.

Another object of the invention is to provide a hub-centric knock-off wheel and adapter on which the wheel and adapter are positively locked in irrotational engagement with respect to one another.

Another object of the invention is to provide a knock-off wheel and adapter design that is useable with disk hubs and drums having differing numbers of lug holes, lug nuts, and hole patterns.

Another object of the invention is to provide a positive engagement, bar-drive adapter and knock-off hub combination in which inward axial motion of the hub relative to the adapter is positively limited.

Another object of the invention is to provide a knock-off hub and adapter combination in which the hub nut precisely centers the wheel hub relative to the adapter.

Another object of the invention is to provide a knock-off hub and adapter in which the hub nut is so constructed as to permit easy attachment and removal of a decorative spinner over the outer hub nut.

Another object of the invention is to provide a hub for spoked wheels in which spoke seats are so constructed as to minimize radial tensile stresses on the hub, decreasing the likelihood of damage to the hub.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends an improved wheel and adapter for use on vehicles. According to the present invention, an adapter has a circular base plate fastenable to a disk hub or brake drum in place of the wheels originally attached to the vehicle, using existing lug bolts or lug nuts. The adapter includes a circular base plate having through its thickness dimension a plurality of holes lying on a circle and adapted to align with holes or studs of a disk brake hub or brake drum. An elongated central coaxial tube having an inner bore large enough to fit over a wheel bearing cap protrudes axially outwards from the base plate, and a plurality of rectangular bars disposed radially outwards from the tube and of shorter axial extent protrudes axially outwards from the base plate.

A wheel for use with the adapter has a stepped diameter hub, the larger diameter of an inner axial portion of the hub having a rear coaxial mounting bore terminating in a flat circular inner wall provided with axially inwardly cut rectangular grooves that are disposed radially outwards from a central circular bore extending through the inner axial portion and through a smaller diameter outer axial portion of the hub. The grooves are adapted to receive the bars protruding axially outwards from the adapter.

The hub is secured to the adapter by means of a cup-shaped hub nut having internal helical threads adapted to engage external threads on the adapter tube. The hub nut has a radially inwardly tapered annular shoulder surrounding the internal threads that is adapted to bear against the inner circumferential wall of the smaller diameter outer tubular section of the wheel hub, thus centering the hub relative to the adapter.

In the preferred embodiment, the hub nut has external hexagonal faces adapted to be driven by an adapter socket provided with the wheel and adapter, the adapter socket having a smaller diameter, hexagonally faced boss adapted to be engaged by a smaller socket and wrench.

Also in the preferred embodiment, a continuous annular groove is formed in the external hexagonal faces of the hub nut. The annular groove is adapted to receive radially inwardly projecting set screws extending through the annular wall of a decorative spinner attachable over the hub nut, thereby securing the spinner to the hub nut. In an embodiment of the wheel utilizing spokes, spoke holes through both axial sections of the hub are provided with ball-shaped inner sockets for seating the ends of the spokes, the ball shape distributing tensional spoke forces more uniformly on the hub, thereby minimizing the likelihood of hub breakage.

DETAILED DESCRIPTION OF THE INVENTION

Figures 1, 2:
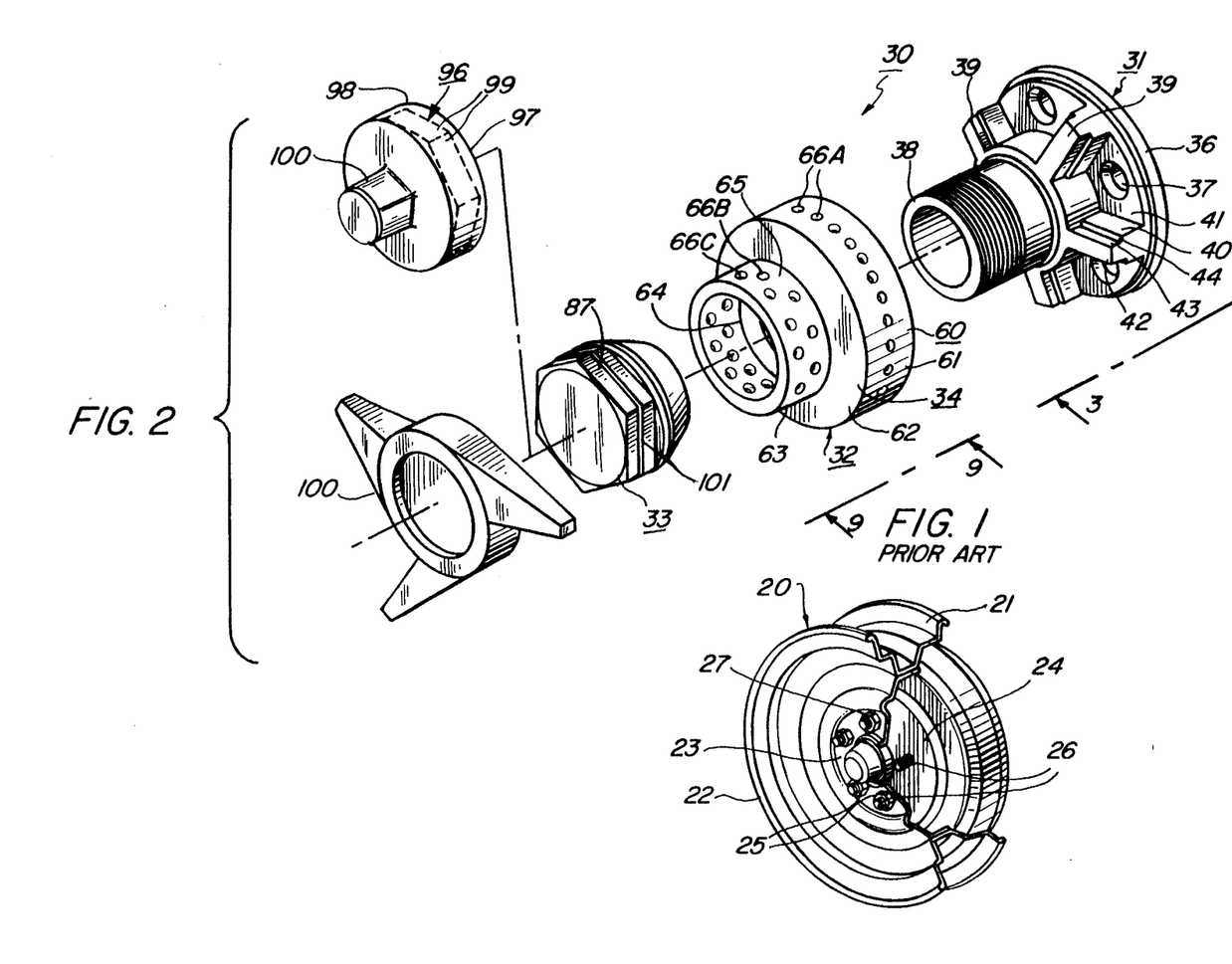
FIG. 1 is a perspective view of prior art wheel showing the wheel attached to a brake drum.
FIG. 2 is an exploded perspective view of a bar-drive wheel hub and adapter according to the present invention.

Referring now to FIGS. 2–16, a novel bar-drive wheel and adapter according to the present invention is shown. The bar-drive wheel and adapter according to the present invention are intended primarily for use as an accessory or after-market item that permits attachment of a knock-off type wheel to the brake drum or disk hub of a vehicle originally equipped with wheels attached by a plurality of lug nuts or lug bolts to the drum or disk hub. That type drum and wheel are shown in FIG. 1, where a wheel 20 having inner and outer flange walls or rims 21 and 22, respectively, joined to a central coaxial hub section 23 is fastened to a brake drum 24 rotatably supported by the axle (not shown) of a vehicle (not shown). As shown in FIG. 1, central hub section 23 has through its thickness dimension a plurality of circumferentially spaced apart holes 25 spaced at a common radial distance from the longitudinal center line of wheel 20. Holes 25 are of the proper size and location to permit insertable reception of threaded studs 26 protruding axially outwards from drum 24. Wheel 20 is secured to drum 23 by means of lug nuts 27 threadingly engaging studs 28, and tightened down onto the flat outer surface of central hub section 23.

FIGS. 2–16 illustrate a novel bar-drive knock-off type wheel and adapter according to the present invention, which allows the wheel to be mounted on disk brake hubs or brake drums of the type shown in FIG. 1.

As shown in FIG. 2, the bar-drive wheel and adapter assembly 30 according to the present invention includes an adapter 31, a wheel 32, and a hub nut 33. In FIG. 2, wheel 32 is shown fragmentarily, with only hub 34 of the wheel shown completely. As will become clear from the ensuing description, wheel 32 may be of the spoked variety, in which hub 34 is joined to a peripheral rim by spokes. Alternatively, wheel 32 may be of the type in which metal webs join the hub 34 to front and rear peripheral flanges, similar to the construction of prior art original equipment wheel 20 shown in the Figure. However, since wheel 32 is generally intended to be an upgraded replacement for original equipment wheels, the webbed version would usually be of a cast magnesium or aluminum construction, rather than the pressed steel construction depicted in FIG. 1.

As shown in FIGS. 2–5, bar-drive adapter 31 includes a circular base plate 36. Base plate 36 has through its thickness dimension a plurality of longitudinally disposed, circumferentially spaced apart holes 37. Holes 37 lie on a circle concentric with base plate 36, and are of the proper size and locations to receive studs projecting from a disk brake disk hub or brake drum of the type and size which the adapter is intended to fit, such as studs 26 protruding from brake drum 24 shown in FIG. 1.

Figures 3, 4, 5, 6, 7, 8:
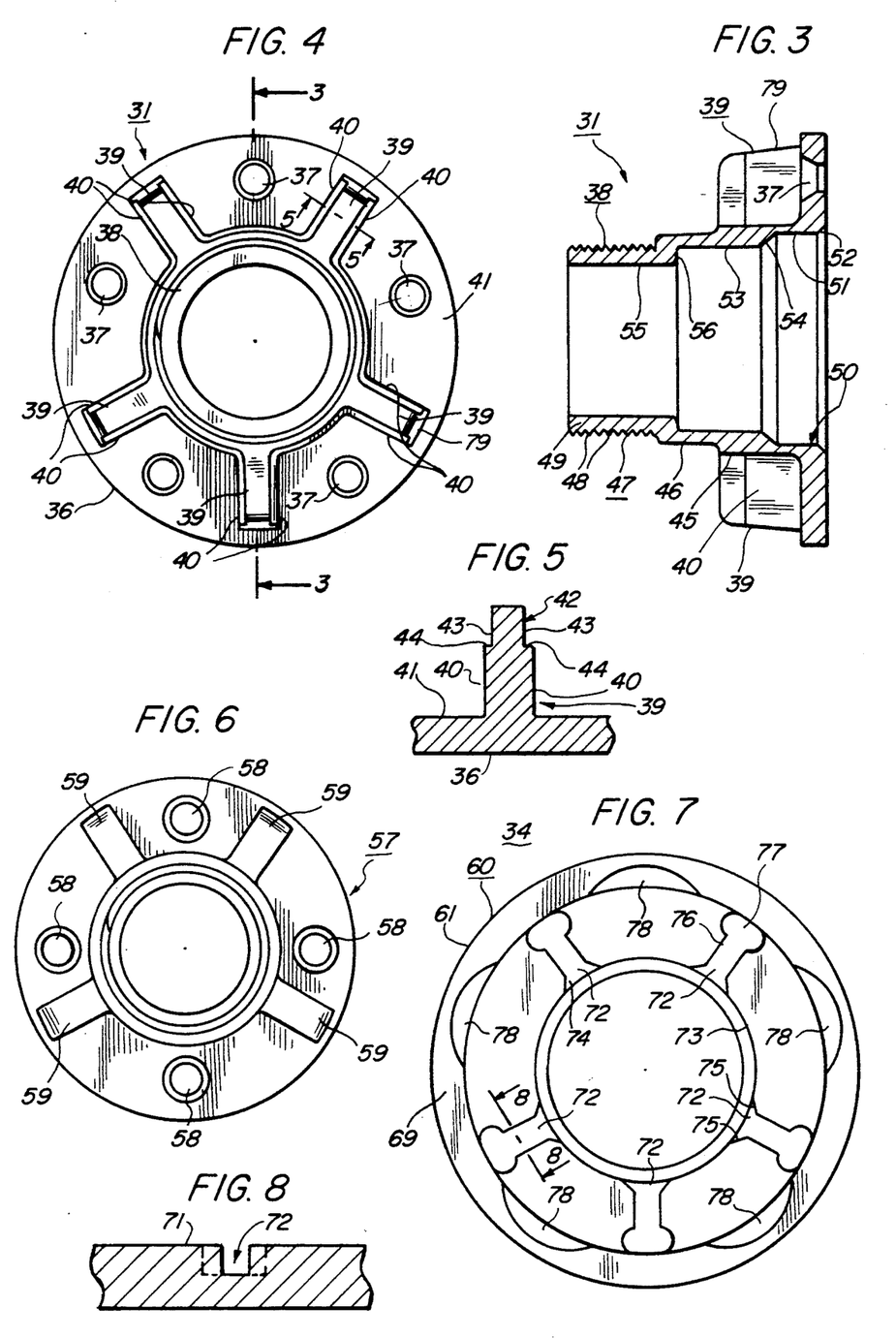
FIG. 3 is a longitudinal sectional view of an adapter comprising part of the structure shown in FIG. 2, taken along line 3—3.
FIG. 4 is an outer elevation view of the adapter of FIG. 3.
FIG. 5 is a fragmentary sectional view of the adapter of FIG. 4, taken along line 5—5 of FIG. 4.
FIG. 6 is an outer elevation view of a modification of the adapter of FIG. 3.
FIG. 7 is an inner elevation view of a wheel hub comprising part of the structure shown in FIG. 2.
FIG. 8 is a fragmentary sectional view of the hub of FIG. 7, taken along line 8—8 of FIG. 7.

As shown in FIG. 2, adapter 31 has a central coaxial tube section 38 that protrudes perpendicularly outwards from base plate 36. A plurality of rectangular cross-section engagement bars 39 that are disposed radially outwards from central coaxial tube section 38 protrudes axially outwards from circular base plate 36. As may be seen best by referring to FIGS. 4 and 5, each engagement bar 39 has a pair of long side walls 40 protruding axially outwards from outer flat annular surface 41 of base plate 36 of adapter 31. Preferably, the outer axial end portion 42 of each engagement bar 39 has a step-wise reduced thickness. Thus, as shown in FIG. 5, upper end portion 42 of each engagement bar 39 has a pair of upper axially disposed side walls 43 recessed inwards towards one another from adjacent larger lower side walls 40. Short upper side walls 43 of each engagement bar 39 are joined to long, lower side walls 40 by perpendicularly disposed ledges or shoulders 44. As will be described in greater detail below, shoulders 44 provide seating planes for wheel hub 34.

As may be seen best by referring to FIG. 3, tube section 38 of adapter 31 has a stepped outer diameter. Thus, tube section 38 has a large diameter base section 45 having an axial height coextensive with that of engagement bars 39, an intermediate axial section 46 of smaller diameter than the base section, and an upper or axially outermost cylindrical section 47 of smaller diameter than the intermediate section. Helical screw threads 48 are formed in the outer wall surface 49 of outer axial section 47 of tube section 38.

As shown in FIG. 3, the inner diameter of central coaxial tube section 38 as also axially stepped. Thus, the inner cylindrical wall surface 50 of tube section 38 has a large diameter base section 51 having a chamfered opening 52, an intermediate cylindrically stepped axial section 53 of smaller diameter than base section 51 and having a chamfered transition surface 54 with base section 51, and a cylindrically-shaped outer axial section 55 of smaller diameter than intermediate section 53 and having a relatively steep annular transition section 56. With tube section 38 formed with stepped inner and outer diameter as described above, a minimum wall thickness is maintained in the tube section to maintain required strength, without making adapter 31 too heavy. Preferably, adapter 31 is made as a steel casting which is finish machined. The purpose of chamfered entrance surfaces 52 and 54 is to allow adapter 31 to slide over the wheel bearing of a wheel with minimum chance of catching the bearing. The purpose of steep transition section 56 is to provide clearance for the end wall of a wheel bearing.

As may be seen best by referring to FIGS. 2 and 4, each bolt hole 37 through base plate 36 of adapter 31 is located on a circle concentric with tube section 38 of the adapter, and is circumferentially located between a pair of engagement bars 39. The adapter 31 shown in FIG. 4 is intended for use with brake drums or disk brake hubs utilizing five lug bolts or lug nuts, and has five bolt holes 37 and five engagement bars 39. Of course, adapter 31 can be constructed to be useable with brake drums or disk brake hubs having differing numbers of bolts or studs. Thus, for example, FIG. 6 shows an adapter 57 having four bolt holes 58 and four engagement bars 59.

Referring now to FIG. 2 and FIGS. 7–10, bar-drive wheel and adapter assembly 30 according to the present invention may be seen to include a wheel hub 34 adapted to lockably fit onto adapter 31.

As shown in FIG. 2, wheel hub 34 has a concave dish-shaped base section 60 having a cylindrically-shaped flange wall 61 and a front transversely disposed tapered annular wall 62. A tubular section 63 coaxial with base section 60 protrudes longitudinally outwards from front annular wall 62 of the base section. Tubular section 63 has a generally cylindrical shape, a bore 64 extending axially through both the tubular section and base section 60. As shown in FIG. 2, cylindrical wall 65 of tubular section 63 and cylindrical flange wall 61 of base section 60 are provided with a plurality of through-holes 66. Thus, as shown in FIG. 1, a first set of rear through-holes 66A spaced apart at regular circumferential intervals lies on a circle on cylindrical flange wall 61 of base section 60. A second, set of intermediate through-holes 66B spaced apart at regular circumferential intervals lies on a circle on the rear portion of tubular section 63 of wheel hub 34. And a third set of front through-holes 66C spaced apart at regular circumferential intervals lies on a circle on the front portion of tubular section 63.

Figures 14, 15, 16:
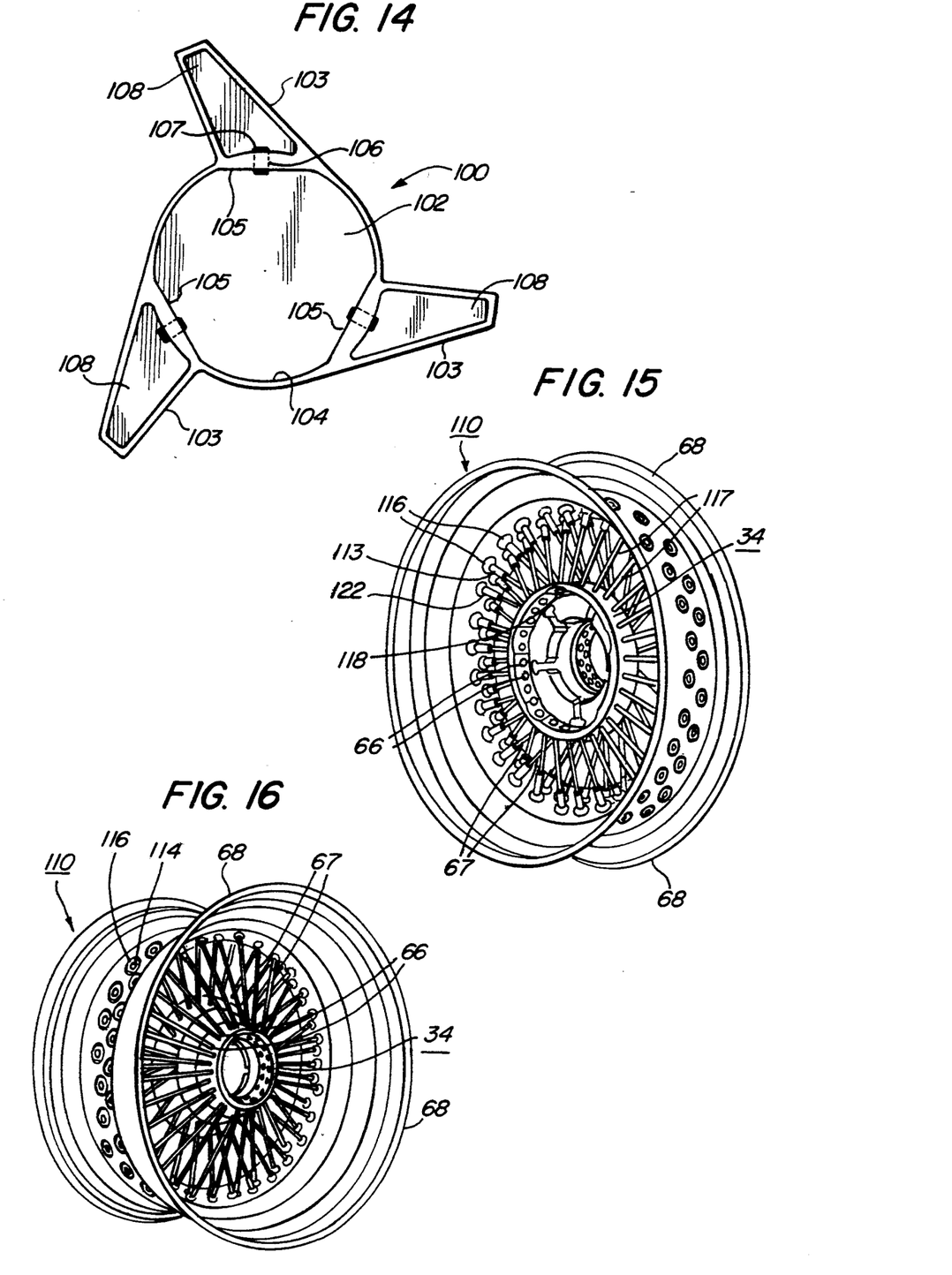
FIG. 14 is an inner elevation view of an optional spinner comprising part of the apparatus of FIG. 2.
FIG. 15 is an inner perspective view of the hub shown in FIG. 2, showing the hub attached to a wheel rim by spokes to comprise a complete spoked wheel.
FIG. 16 is an outer perspective view of the wheel of FIG. 13.

As may be seen best by referring to FIGS. 15 and 16, holes 66 are adapted to receive spokes 67 that secure hub 34 of wheel 32 to a tire-supporting rim 68. As will become apparent from the ensuing description of the internal structure and function of wheel hub 34, the hub could be joined to the rim of a cast wheel by an integral annular web, rather than spokes.

Figure 9:
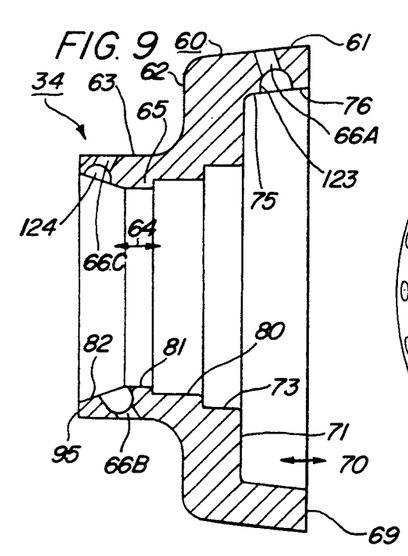
FIG. 9 is a longitudinal sectional view of the wheel hub of FIG. 7, taken along line 9—9 of FIG. 2 and showing part of the adapter of FIG. 2.

Referring now to FIGS. 7 and 9, wheel hub 34 may be seen to have a rear wall 69 provided with a circular opening or counterbore 70 terminating in a flat inner annular wall 71 encircling smaller diameter bore 64 extending through the hub. As may be seen best by referring to FIGS. 7 and 8, a plurality of rectangular cross-section slots 72 are cut longitudinally forward into flat annular wall 71. Slots 72 penetrate the inner cylindrical wall 73 that runs longitudinally outwards from flat annular wall 71, and are disposed radially outwards from bore 64 and the cylindrical wall. Slots 72 are of the proper size, shape and location to insertably receive engagement bars 39 of adapter 31.

As shown in FIG. 7, wheel hub 34 has five radially disposed slots 72 spaced apart at unequal circumferential intervals. With this configuration, wheel hub 34 is adapted to lockably receive a five-bar adapter 31 having five lug nut holes, as shown in FIG. 4, or a four-bar adapter 57 having four lug nut holes, as shown in FIG. 6. Other numbers and arrangements of slots 72 and engagement bars could also be utilized according to the present invention.

As shown in FIG. 7, the inner radial opening 74 of each slot 72 in inner cylindrical wall 73 has beveled side walls 75. The purpose of beveled side walls 75 is to facilitate reception of engagement bars 59. As may also be seen by referring to FIG. 7, the outer radial end of each slot 72, adjacent inner cylindrical wall surface 76 of flange wall 61 of base section 60 of wheel hub 34 preferably has a transversely disposed oval enlargement 77. The function of oval enlargements 72 is to provide clearance for walls 40 of engagement bars 39.

Referring still to FIG. 7, it may be seen that a plurality of concave arcuate grooves or scallops 78 is formed in the inner cylindrical wall surface 76 of flange wall 61. Each scallop 78 is located between a pair of slots 72. Scallops 78 are so located as to provide clearance for the head of a bolt or nut inserted through bolt hole 37, when engagement bars 39 of the adapter are inserted into slots 72.

As may be seen best by referring to FIG. 9, wheel hub 34 has a stepped inner diameter. Thus, wheel hub 34 has a rear opening or counterbore 70, of relatively large diameter, the counterbore having inwardly tapered cylindrical side walls 76, of the proper diameter and shape to provide clearance for the tapered outer side walls 79 of engagement bars 39. Inner cylindrical wall 73 having therein inner openings 74 of slots 72 is located axially outwards of rear flange wall 61, and has a smaller diameter than counterbore 70. Axially forward of inner cylindrical wall 73 is a smaller diameter cylindrical section 80, and front cylindrical section 81 of still smaller diameter. Forward of front cylindrical section 81 is a frusto-conically tapered front annular entrance wall 82 that has an outer, entrance inner diameter larger than bore 64 of outer tubular section 63.

Figure 10:
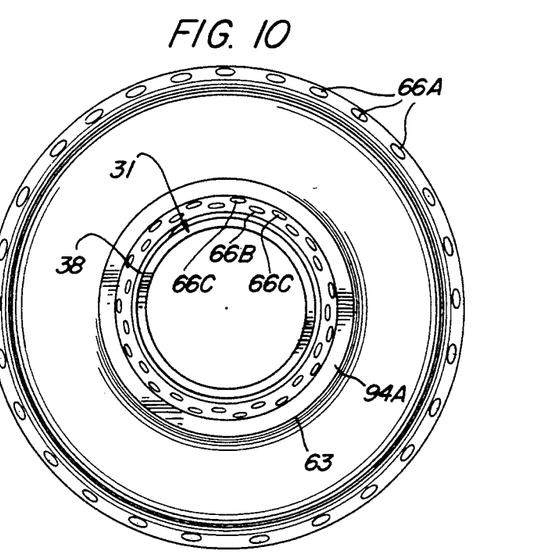
FIG. 10 is an outer elevation view of the wheel hub of FIG. 7, showing the hub installed on the adapter of FIG. 2.

FIGS. 9 and 10 illustrate the axial location of threaded outer longitudinal section 47 of central tube section 38 of adapter 31 relative to frusto-conically tapered front opening 82 of wheel hub 34, with the wheel hub slid axially over the adapter sufficiently far for shoulders 44 of engagement bars 39 to be seated on corners of slots 72 in the wheel hub. With wheel hub 34 engaged by bar-drive wheel adapter 31 as shown in FIGS. 9 and 10, they are secured longitudinally with respect to one another by means of the hub nut 33, as shown in FIG. 2. The structure and function of hub nut 33 may be best understood by referring to FIGS. 11-13.

Figures 11, 12, 13:
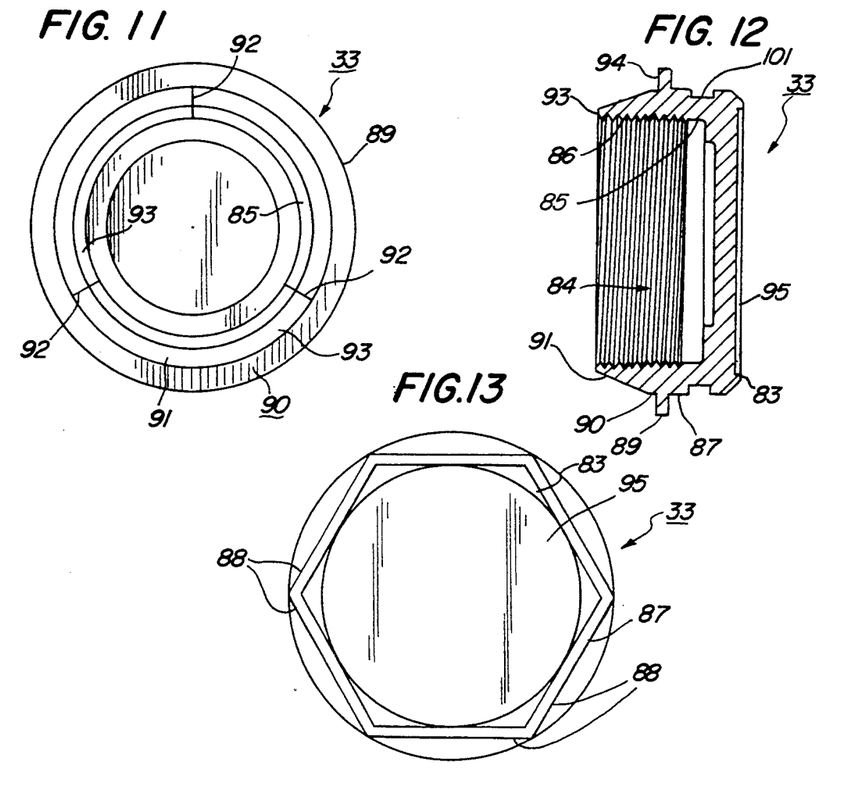
FIG. 11 is an inner elevation view of a hub nut comprising part of the structure shown in FIG. 2.
FIG. 12 is a longitudinal sectional view of the hub nut of FIG. 9.
FIG. 13 is an outer elevation view of the hub nut of FIG. 10.

As shown in FIGS. 11-13, hub nut 33 is generally cup-shaped, having a flat front transverse wall 83 and a concave rearward facing opening 84 encircled by an annular rear wall 93. As may be seen best by referring to FIGS. 11 and 12, hub nut 33 has an inner cylindrical wall surface 85 adjacent rear opening 84, in which is formed internal helical threads 86 that are adapted to engage external helical threads 48 on longitudinally outermost section 47 of central coaxial tube section 38 of adapter 31.

As may be seen best by referring to FIG. 13, hub nut 33 has a front section 87 having in the outer wall surface thereof external axially disposed hexagonal faces 88 adapted to be engaged by a wrench. As shown in FIG. 12, the axial length of front section 87 of hub nut 33 is slightly less than half of the overall length of the hub nut, although this length relationship is not critical.

As shown in FIGS. 12 and 13, hub nut 33 preferably has an annular ring section 89 located immediately rearward of front section 87, the ring section 89 having an outer diameter slightly larger than a circle circumscribing the hexagonal walls 88 of the front section.

As may be seen best by referring to FIGS. 11 and 12, hub nut 33 has a rear section 90 having a frusto-conically shaped outer wall surface 91 that tapers from a front diameter smaller than ring-shaped section 89, to a still smaller rear diameter. Frusto-conically shaped outer wall 91 of rear section 90 of hub nut 33 is of the proper size and shape to bear against the frustoconically tapered front inner opening 82 of wheel hub 34, when the hub nut is screwed down onto threaded outer section 48 of central tube section 38 of adapter 31.

As shown in FIG. 11, rear section 90 of hub nut 33 preferably has a plurality of thin axially disposed slots 92 cut axially forward from rear annular wall 93. Slots 92 are spaced apart at 120-degree circumferential angles. The function of slots 92 is to permit slight radial outward movement of outer wall 91 of rear section 90 when hub nut 31 is screwed down on threaded section 48 of adapter 31. Radial outward movement of outer wall 91 causes it to bear against tapered inner wall 82 of wheel hub 34, thus facilitating centering the hub with respect to the adapter.

Preferably, frusto-conically shaped outer wall 91 of hub nut 33 has an outer surface that resists galling when the hub nut is screwed onto tube section 38 of adapter 31, which action causes both radial and tangential frictional forces to be exerted on outer wall 91 by adjacent inner tapered wall 82 of the tube section. In the preferred embodiment, therefore, hub nut 33 is fabricated from aluminum, with the outer wall 91 being hard anodized to resist galling.

Preferably, center ring-shaped section 89 of hub nut 33 has an outer diameter of approximately the same size as the outer diameter of front tubular section 63 of wheel hub 34. With this arrangement, screwing hub nut 33 down onto tube section 38 of adapter 31 locates the rear annular wall 94 of ring-shaped section 93 in a protective overlying relationship to outer annular wall 94A of wheel hub 34. As shown in FIG. 13, a decorative circular spot face 95 may be formed in outer transverse wall 83 of hub nut 33.

Typical applications for the bar drive wheel and adapter according to the present invention include replacements for automobile and truck wheels having rim diameters over the approximate range of 13 inches to 17 inches. For wheels in this size range, hub nut 33 would typically have about a 3-3/16 inch span between the outer wall surfaces of a pair of diametrically opposed hexagonal walls 88. Since this size hub nut would require a wrench larger than typically found in tool kits, the bar drive wheel and adapter according to the present invention preferably includes an adapter socket 96, as shown in FIG. 2. Adapter socket 96 has a concave cup-shaped base section 97 with a hexagonal-shaped opening 98 having hexagonally arranged flat inner walls 99. Opening 98 and flat inner walls 99 are of the proper size and shape to insertably receive front section 87 of hub nut 33. Adapter socket 96 includes a hexagonal cross-section boss 100 that protrudes forward from base section 97 of the adapter socket. Boss 97 is of the proper size and shape to be driven by a standard wrench socket, having a diameter, for example of about one inch.

As shown in FIG. 2, the bar drive wheel and adapter according to the present invention may include a decorative spinner 100 that fits over hub nut 33. The structure that facilitates attachment of spinner 100 to hub nut 33 may be best understood by referring to FIGS. 12 and 14.

As shown in FIG. 12, a continuous annular groove 101 may be formed in the hexagonal walls 88 of front axial section 87 of hub nut 33. Groove 101 is located between outer transverse wall 83 and ring-shaped section 89 of hub nut 33. The function of groove 101 is to receive set screws threaded into spinner 100, as will now be described.

Referring now to FIG. 14, spinner 100 may be seen to have a rearwardly concave central hub section 102. A plurality of arms 103 each having a concave rear surface protrudes outwards from hub section 102. The inner axially disposed wall 104 of central hub section is modified from a cylindrical shape by three flat chordal walls 105 circumferentially spaced apart at 120 degree increments. The spacing and location of chordal walls 105 are adapted to receive hexagonally faced front axial section 87 of hub nut 33, one chordal wall being adjacent every other hexagonal face wall 88. Each of the chordal walls 105 has through its center a threaded hole 106 adapted to receive a set screw 107 that protrudes radially outwards into the concave opening 108 in the rear of an arm 103. Thus positioned, set screws 107 may advance through holes 106 into annular groove 101 of hub nut 33, securing spinner 100 to the hub nut.

As was pointed out previously, the novel construction of the bar drive wheel and adapter according to the present invention may utilize a hub 34 having those novel construction features that permit engagement of the hub by the adapter 31, but cast integrally with a rim and web, and without the spoke holes shown in the figures.

FIGS. 7, 9, 10, 15 and 16 illustrate a novel spoke wheel construction according to the present invention.

Referring now to FIGS. 15 and 16, a spoke wheel or "wire wheel" 110 as it is commonly referred to may be seen to include a central wheel hub 34 attached to an outer coaxial tire rim 68 by a plurality of elongated spokes 67. Each spoke 67 includes an elongated outer rod 113 that has a ball-shaped enlargement 114 on an outer end thereof. Outer rod 113 has a threaded inner end 115. As shown in FIG. 15, outer rod 113 of each spoke 67 is inserted into a hole 116 provided through rim 68, and pushed radially inwards towards wheel hub 34.

Each spoke 67 also includes an elongated inner rod 117 that has a ball-shaped enlargement 118 on an inner end thereof. Inner rod 117 also has a threaded outer end 119. As shown in FIG. 15, inner rod 117 of each spoke 112 is inserted into a hole 66A provided through flange wall 61 of wheel hub 34, or through a hole 66B provided through front tubular section 63 of the wheel hub. Thus positioned, threaded inner end 115 of outer spoke rod 113 and threaded inner end 119 of inner spoke rod 117 are threaded into opposite internally threaded openings of a turnbuckle 122 which is then turned to draw the spoke rods towards one another.

As may be seen best by referring to FIG. 9, each spoke hole 66A through rear flange wall 61 of wheel hub 34 is counterbored in inner cylindrical wall 76. In contrast to prior art spoke wheel construction, counterbore 123 for each spoke hole 66A is arcuately contoured, rather than beveled. Arcuately contoured counterbore surface 123 forms a cup-shaped seat for ball-shaped enlargement 118 at the inner end of inner spoke rod 117. The cup-shaped seat distributes tensile stress, exerted by the ball-shaped end of the spoke rod when turnbuckle 132 is tightened, over a larger area than would be encountered with a beveled seat. Thus, the novel cup-shaped design of the spoke seats in the wheel hub according to the present invention result in a construction that has proved to be substantially more resistant to tensile cracking or breakage than prior wheel hubs using beveled spoke seats. It has also been found that inclining the axis of hole 66A at an angle of about 12 degrees ± one degree to the outer surface of flange wall 61, which is inclined at an angle of about 6 degrees ± one degree to the longitudinal axis of the spoke hub, results in greater resistance to tensile fracture than prior art wheel hubs, which typically employ a bore inclination angle of about 35 degrees.

For the reasons stated above, each spoke hole 66B and 66C through front tubular section 63 of wheel hub 34 also has an arcuately-shaped counterbore 124. Also, the axes of each hole 66B and 66C are preferably inclined at angles of 30 degrees ± one degree, and 32 degrees ± one degree, respectively, which inclination angles provide greater fracture resistance than prior art construction where typically these inclination angles are about 20 degrees.

As shown in FIGS. 15 and 16, each spoke hole 116 through wheel rim 68 is also preferably arcuately counterbored, for the reasons stated above.

What is claimed is:

1. An adapter providing the capability for installing knock-off type wheels on a disk brake hub or brake drum of a vehicle utilizing wheels of the type that are attached by means of a plurality of lug bolts or lug nuts in a circular pattern, said adapter comprising;
   a. a base plate having through its thickness dimension a plurality of mounting holes adapted to register with lug bolt holes or studs of a wheel disk brake hub or brake drum,
   b. an elongated hollow tube protruding axially outwards from said base plate, said tube having a bore extending through said base plate and having an inner or rear opening of sufficient size to fit over the wheel bearing cap of said disk brake hub or brake drum, said tube having on the exterior surface of an outer axial portion thereof helical threads adapted to be engaged by an internally threaded cup-shaped hub nut, and
   c. a plurality of engagement bars protruding axially outwards from said base plate and disposed radially outwards from said tube, said engagement bars adapted to be insertably received into registered grooves formed in the inner transverse wall surface of a wheel.

2. The adapter of claim 1 wherein said base plate is further defined as having a circular plan view shape.

3. The adapter of claim 2 wherein said hollow tube is further defined as being coaxial with said base plate.

4. The adapter of claim 3 wherein said mounting holes are circumferentially spaced apart from said engagement bars.

5. The adapter of claim 4 wherein said mounting holes and said engagement bars circumferentially alternate.

6. The adapter of claim 5 wherein said engagement bars are of lesser axial extent than that of said tube.

7. The adapter of claim 6 wherein said engagement bars have a generally flat axially outermost surface lying in plane parallel to said base plate.

8. The adapter of claim 7 wherein said engagement bars are further defined as having a generally rectangular cross-sectional shape.

9. The adapter of claim 8 wherein said engagement bars are further defined as having an outer axial end portion of less thickness and length than the inner axial portion thereof, said outer and inner axial portions of said engagement bar intersecting to form on each radial side of said engagement bar a flat ledge or shoulder adapted to seat on the inner transverse wall of a wheel.

10. The adapter of claim 6 wherein the circumferential spacing of said engagement is rotationally non-periodic for rotations of less then 360 degrees.

11. A knock-off type wheel hub for installation on an adapter attached to disk brake hub or brake drum of a vehicle, said wheel hub having a body provided with a central bore of stepped diameter adapted to fit coaxially over said adapter, said hub having a counterbored rear wall terminating in a flat circular inner wall provided with a plurality axially inwardly cut grooves disposed radially outwards from said bore and adapted to insertably receive engagement bars protruding axially outwards from said adapter.

12. The wheel hub of claim 11 wherein said body is further defined as having a concave dish-shaped base section and a tubular front section of smaller outer diameter than said base section.

13. The wheel hub of claim 12 wherein said base section of said body is further defined as having through the cylindrical wall thereof a plurality of spoke holes spaced apart at regular circumferential intervals.

14. The wheel hub of claim 13 wherein said spoke holes are further defined as having at the inner entrance opening thereof a cup-shaped counterbore adapted to seat a ball-shaped enlargement at the end of a spoke.

15. The wheel hub of claim 14 wherein the outer cylindrical wall surface of said base section is further defined as tapering to a smaller front diameter.

16. The wheel hub of claim 15 wherein the axis of said spoke holes is inclined at an angle of about 19 degrees ± 10 degrees to the outer cylindrical wall surface of said base section.

17. The wheel hub of claim 12 wherein said tubular front section of said body is further defined as having through the cylindrical wall thereof a plurality of spoke holes spaced apart at regular circumferential intervals.

18. The wheel hub of claim 17 wherein said spoke holes are further defined as having at the inner entrance opening thereof a cup-shaped counterbore adapted to seat a ball-shaped enlargement at the end of a spoke.

19. The wheel hub of claim 18 wherein the axis of said spoke holes is inclined at an angle of about 26 degrees ± 5 degrees.

20. In combination a wheel and adapter allowing the wheel to be fastened by means of a single knock-off type hub nut to a disk brake hub or brake drum of a vehicle utilizing wheels of the type that are attached by a plurality of lug bolts or lug nuts arranged in a circular pattern, said combination comprising;
  a. an adapter including
    (i) a circular base plate having through its thickness dimension a plurality of mounting holes adapted to register with lug bolt holes or studs of a disk brake hub or brake drum,
    (ii) an elongated hollow tube integral and coaxial with said base plate, said tube protruding perpendicularly outwards from said base plate and having therethrough a central coaxial bore extending through said base plate, said bore having an inner or rear opening of sufficient size to fit over the wheel bearing cap of said disk brake hub or brake drum, said tube having on the exterior surface of an outer axial portion thereof helical threads adapted to be threadingly engaged by internal threads provided in a cup-shaped hub nut,
    (iii) a plurality of engagement bars protruding axially outwards from said base plate and disposed radially outwards from said tube, said engagement bars adapted to be insertably received into registered grooves formed in the inner transverse wall surface of a wheel, and
  b. a wheel including a hub having a circularly symmetric body including a concave dish-shaped base section and a tubular front section of smaller diameter than said base section, said base section having a flat circular inner transverse wall provided with a plurality of axially inwardly cut grooves disposed radially outwards from said bore and adapted to insertably receive said engagement bars of said adapter.

21. The combination of claim 20 wherein said tubular front section of said wheel hub is further defined as having a frustoconically shaped inner bore that tapers axially inwardly to a smaller diameter.

* * * * *